United States Patent
Fukao

(10) Patent No.: US 7,505,158 B2
(45) Date of Patent: Mar. 17, 2009

(54) IMAGE PROCESSING DEVICE

(75) Inventor: Osami Fukao, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 725 days.

(21) Appl. No.: 10/249,230

(22) Filed: Mar. 25, 2003

(65) Prior Publication Data

US 2004/0190040 A1    Sep. 30, 2004

(51) Int. Cl.
*G06K 15/00* (2006.01)
*H04N 1/00* (2006.01)

(52) U.S. Cl. .............. 358/1.15; 358/1.16; 358/405

(58) Field of Classification Search ............ 358/1.15, 358/468, 1.19, 400, 1.16, 508, 403, 405, 358/407, 408, 440, 438, 439; 700/17; 379/100.01, 379/100.02
See application file for complete search history.

(56) References Cited

U.S. PATENT DOCUMENTS

| | | | |
|---|---|---|---|
| 6,438,574 B1* | 8/2002 | Nagashima | 718/102 |
| 6,577,907 B1* | 6/2003 | Czyszczewski et al. | 700/17 |
| 6,781,721 B2* | 8/2004 | Toyoda et al. | 358/402 |
| 6,965,446 B2* | 11/2005 | Wakabayashi | 358/1.15 |
| 7,221,469 B2* | 5/2007 | Morita | 358/1.15 |
| 2002/0051146 A1* | 5/2002 | Tanimoto | 358/1.9 |
| 2002/0051221 A1* | 5/2002 | Wakabayashi | 358/402 |
| 2002/0063882 A1* | 5/2002 | Sekiguchi | 358/1.15 |
| 2002/0131073 A1* | 9/2002 | Toyoda et al. | 358/1.15 |

FOREIGN PATENT DOCUMENTS

| | | |
|---|---|---|
| JP | 02-069071 A | 3/1990 |
| JP | 06-133141 A | 5/1994 |
| JP | 10-243205 A | 9/1998 |
| JP | 11-252348 A | 9/1999 |
| JP | 2000-092263 A | 3/2000 |
| JP | 2000-358122 A | 12/2000 |
| JP | 2001-285561 A | 10/2001 |

* cited by examiner

*Primary Examiner*—Jerome Grant, II
(74) *Attorney, Agent, or Firm*—Shinjyu Global IP

(57) ABSTRACT

An image processing device is disclosed which is connected to a local area network and to a public telephone network, and is comprised of an image processing means and a fax server means. The fax server means is capable of acquiring image data from the image processing means, or other image processing devices and/or data processing devices connected thereto via the local area network, and facsimile transmitting the image data over the public telephone network. This configuration eliminates the need to equip each image processing device and data processing device with a fax modem, and thus lowers the initial cost of installing these devices, lowers the cost of accessing the public telephone network, and lowers the cost of administering the system.

19 Claims, 4 Drawing Sheets

IMAGE PROCESSING DEVICE

BACKGROUND OF INVENTION

1. Field of the Invention

The present invention relates to an image processing device, and more particularly to an image processing device connected to a public telephone network.

2. Background Information

Image processing devices, such as copying machines and the like, that can facsimile transmit image data acquired thereby over a public telephone network are well known in the prior art.

An image processing device that has this type of facsimile transmission function is comprised of a fax modem that can facsimile transmit image data acquired by the image processing device.

For example, as shown in FIG. 3, if a business A moves into a three story building, and places a copying machine 10b on the first floor, a copying machine 20b on the second floor, and a copying machine 30b on the third floor, it will be necessary to provide each copying machine 10b, 20b, and 30b with a fax modem 60 so that each copying machine can facsimile transmit the image data acquired thereby.

However, providing each copying machine 10b, 20b, and 30b with its own fax modem is comparatively expensive and increases their initial installation costs.

In addition, if a fax modem 60 is provided for each copying machine 10b, 20b, and 30b, the fees for accessing the public telephone network KN will increase because the copying machines 10b, 20b, and 30b will all have to be connected thereto. In particular, it is quite wasteful to pay these access fees if the frequency at which facsimiles are transmitted is not very high.

Accordingly, as shown in FIG. 4, connecting copying machines 10c, 20c, and 30c to a fax server 55 has been considered as a means of solving the aforementioned problems. This fax server 55 accepts image data from the copying machines 10c, 20c, and 30c and data processing devices 100, 200, and 300, and facsimile transmits this image data over the public telephone network KN.

However, providing a separate fax server 55 will increase the number of devices that a systems administrator has to manage. Moreover, separating the devices in this way will increase the cost of administering the system.

SUMMARY OF INVENTION

It is an object of the present invention to provide an image processing device in which the initial cost of installation is reduced, the cost of accessing a public telephone network therewith is reduced, and the cost of administering the system is reduced, when used in an environment that employs a plurality of image processing devices to transmit facsimiles.

The aforementioned object is achieved by connecting an image processing device comprising an image processing means and a fax server means to a public telephone network. The image processing means serves to process image data. The fax server means is capable of facsimile transmitting the image data acquired from the image processing means over the public telephone network.

This allows one to easily construct an environment that is capable of facsimile transmitting image data from a plurality of image processing devices (such as copying machines), because one of the plurality of image processing devices has a fax server installed therein. In addition, it will no longer be necessary to install a fax modem in each image processing device in this environment and connect each of them to the public telephone network, because the only image processing device in the environment that need be connected thereto is the image processing device of the present invention (i.e., the one containing the fax server). This will allow a reduction in the public telephone network access fees. Furthermore, the job of the system administrator will be made easier because the image processing device of the present invention contains the fax server.

The aforementioned image processing device may also be connected to an internal network that is connected to other image processing devices and/or data processing devices (such as personal computers). The fax server means is also capable of transmitting facsimiles of image data acquired from these other image processing devices and/or data processing devices.

This configuration makes it possible to use the fax server means to facsimile transmit image data acquired from various types of image processing devices and data processing devices via the internal network.

In addition, the aforementioned image processing device further comprises a user data storage means that can store one or more user IDs that identify users that transmit facsimiles, and associate a user ID to a corresponding e-mail address and store that data. Based on the data stored in the user data storage means, the image processing device can notify a user having a particular user ID of the results of their facsimile transmission.

This configuration allows the image processing device to notify a user whether or not, for example, their facsimile transmission has been completed, and also allows the user to confirm the details of their facsimile transmission.

Furthermore, the image processing device further comprises a transmission storage means that is capable of associating two or more data items selected from data relating to the user ID of a user that transmits a facsimile, the data and time that acquired image data was facsimile transmitted, and the image processing device or data processing device that generated a request to transmit a facsimile.

This configuration allows one to search the transmission storage means for data regarding a facsimile transmission, and also allows one to identify a user that transmitted a facsimile and the device used.

In addition, the image processing device further comprises a temporary storage means that is capable of temporarily storing image data that is to be facsimile transmitted if the fax server means is not immediately able to transmit the facsimile.

With this configuration, the temporary storage means will store a facsimile in situations in which the image processing device cannot transmit the facsimile due to some type of problem. After this problem has been resolved, the facsimile will be transmitted.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF DRAWINGS

Referring now to the attached drawings which form a part of this original disclosure.

DETAILED DESCRIPTION

Figure 1:
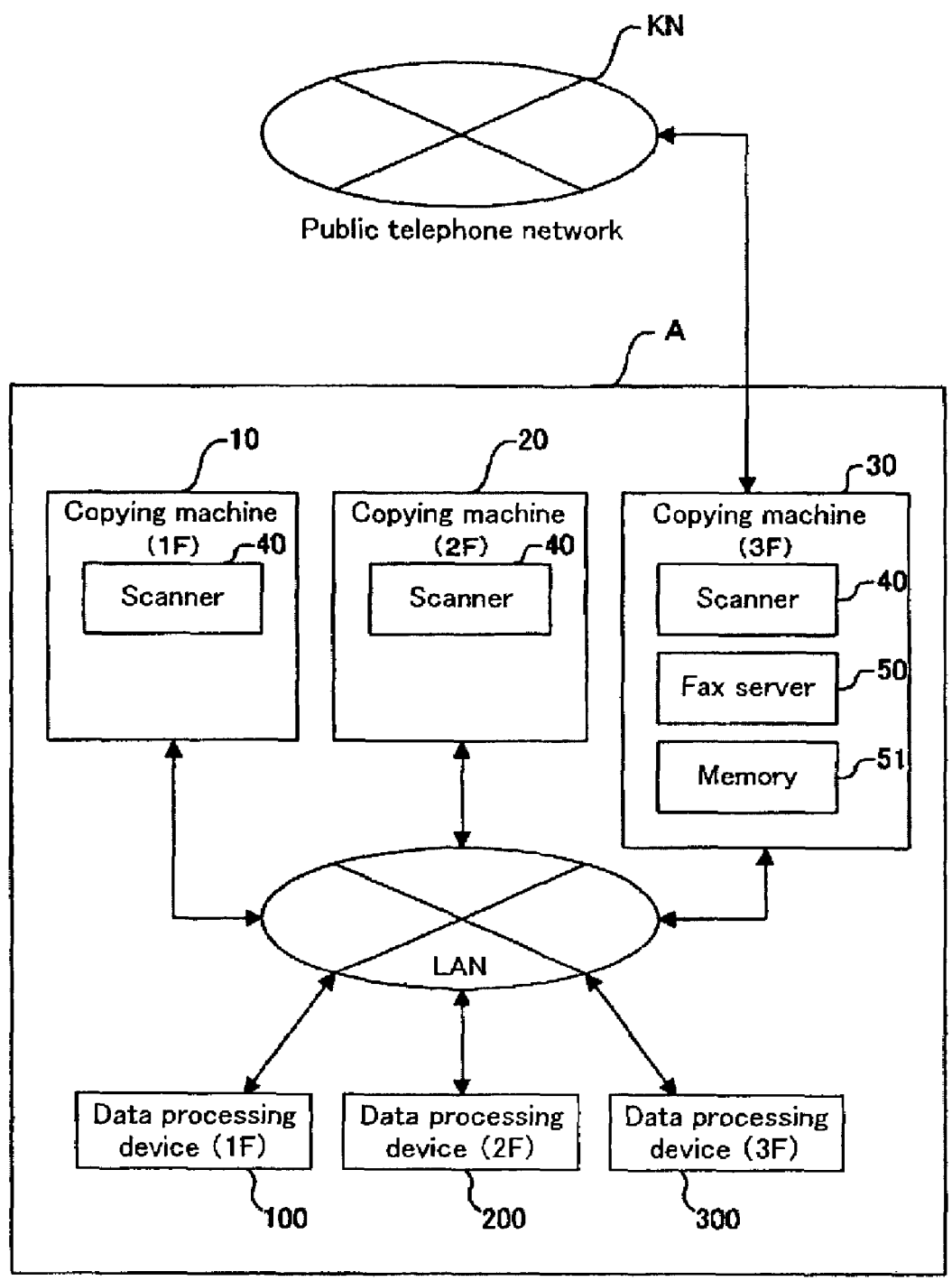
FIG. 1 shows an example of an environment in which an image processing device according to an embodiment of the present invention is disposed.
Figure 2:
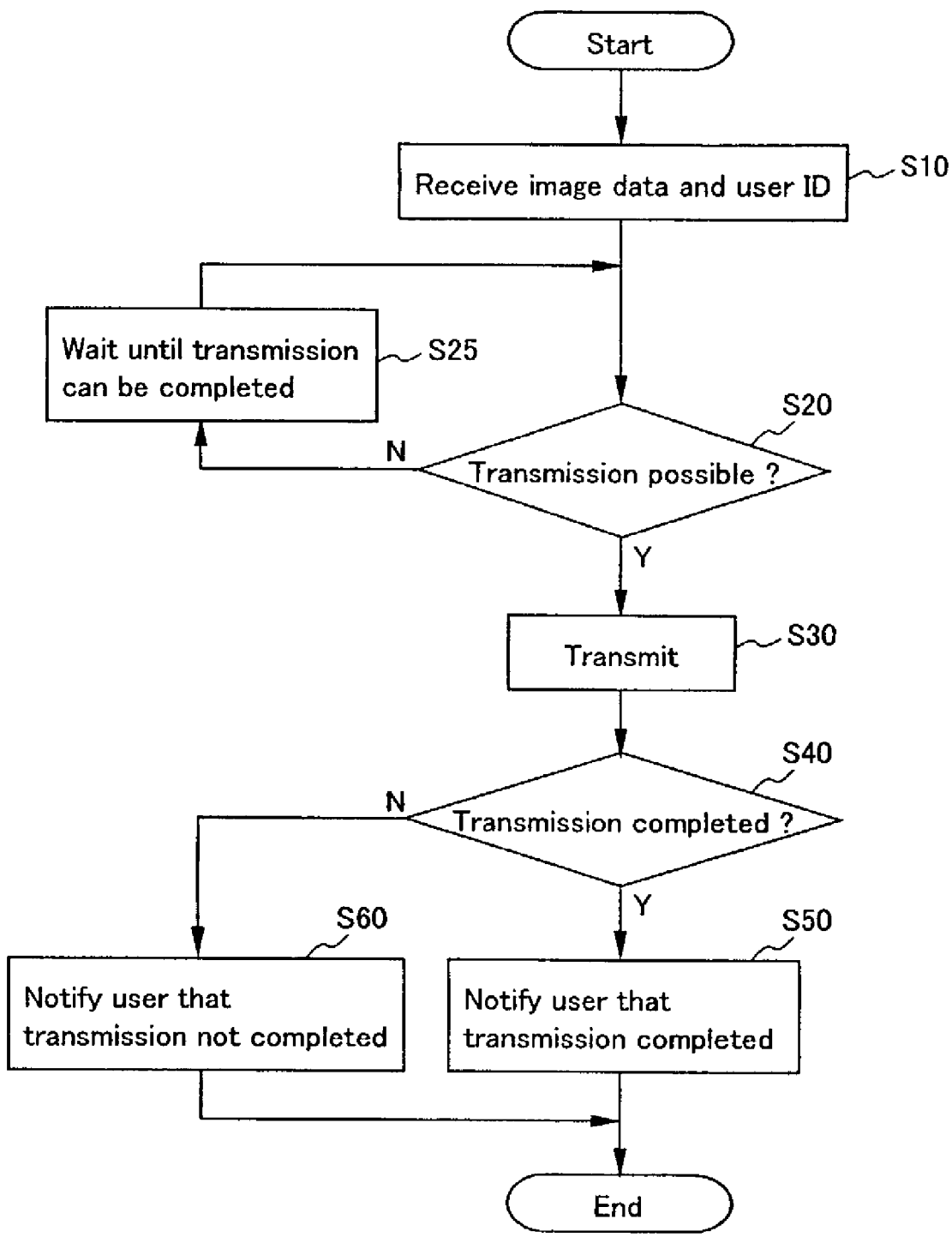
FIG. 2 is a flowchart showing the process by which the image processing device of FIG. 1 transmits a facsimile.
Figure 3:
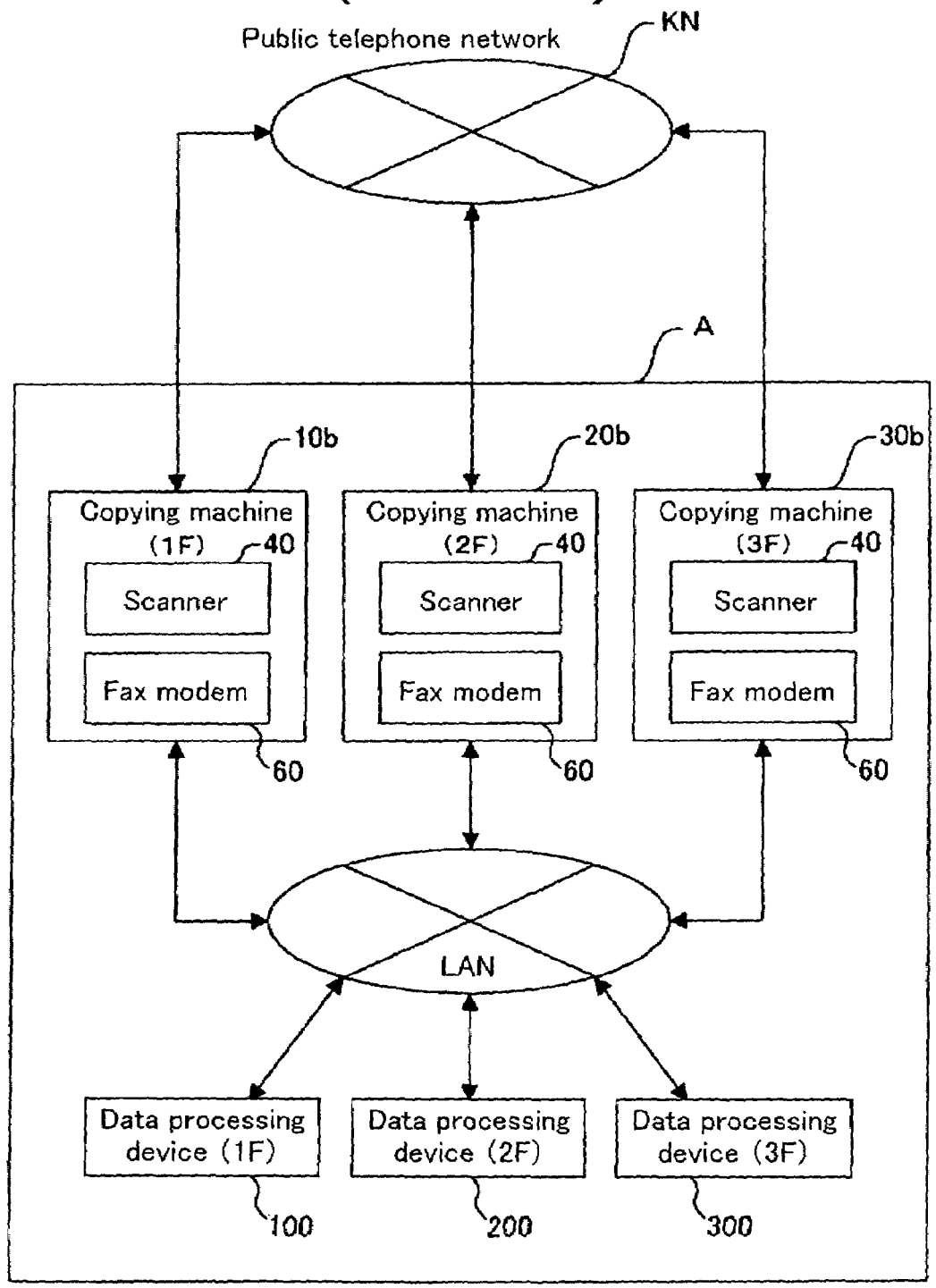
FIG. 3 shows an example of an environment in which conventional image processing devices use fax modems to transmit facsimiles.
Figure 4:
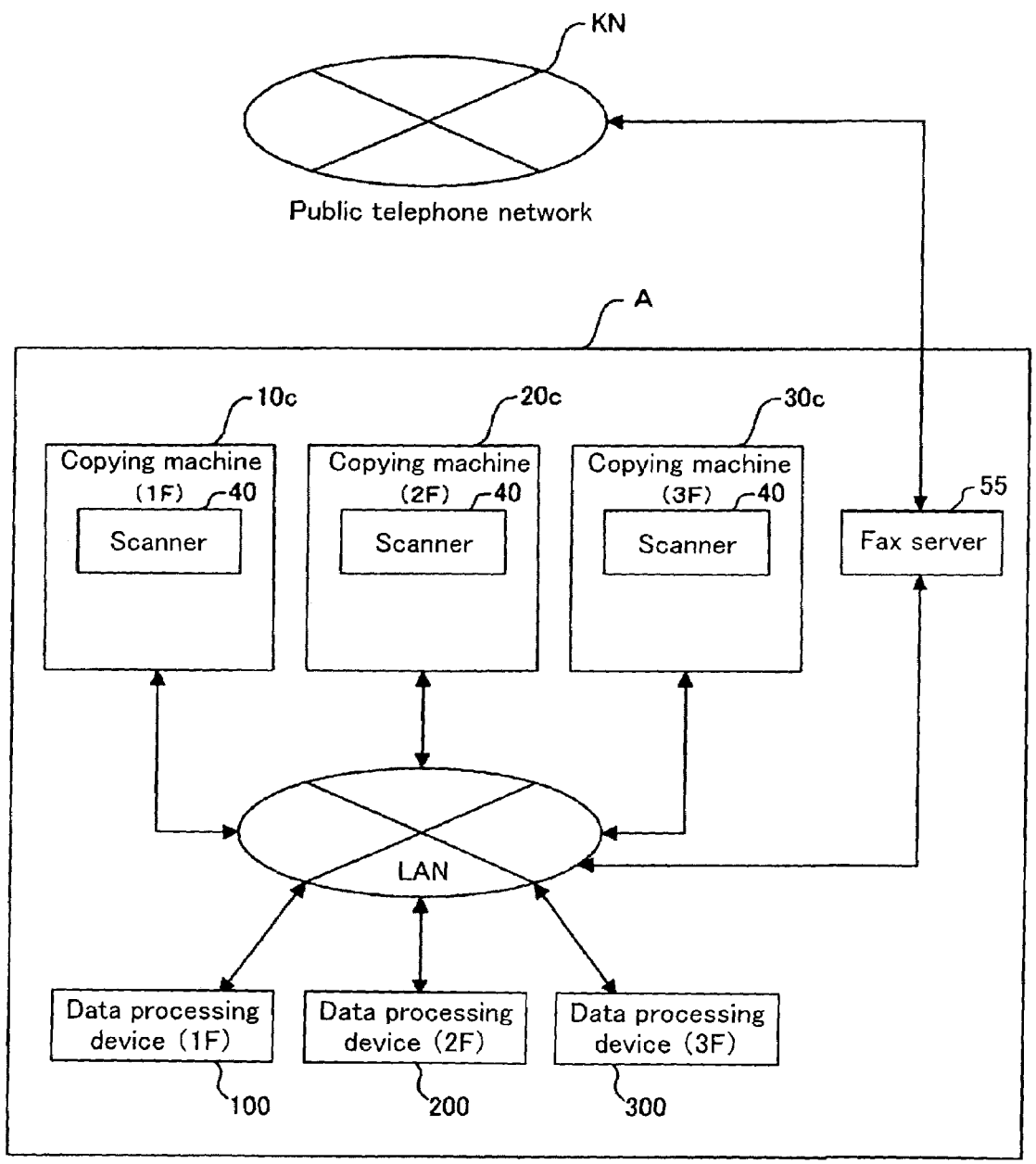
FIG. 4 shows an example of an environment in which conventional image processing devices use a separate fax server to transmit facsimiles.

An embodiment of the present invention will be described below with reference to the figures. FIG. 1 shows an example of an environment in which an image processing device (a copying machine 30) according to an embodiment of the present invention is disposed. FIG. 2 is a flowchart showing the process by which the copying machine 30 transmits a facsimile. FIG. 3 shows an example of an environment in which conventional copying machines use fax modems to transmit facsimiles. FIG. 4 shows an example of an environment in which conventional copying machines use a fax server is used to transmit facsimiles.

First, as shown in FIG. 1, the environment in which the copying machine 30 according to an embodiment of the present invention is disposed will now be described.

The copying machine 30 is an example of an image processing device, and serves to print out image data read by a scanner 40 included therein or image data acquired from data processing devices 100, 200, and 300. The copying machine 30 is connected to copying machines 10, 20 via a local area network (one example of an internal network), and is also connected to a public telephone network KN. The copying machine 30 has the same functions as copying machines 10, 20, but also comprises a fax server 50 (one example of a fax server means) and a memory 51 (one example of a user data storage means and a temporary storage means).

The environment described in FIG. 1 is a three story building occupied by a business A, but of course the present embodiment is in no way limited thereto. Note that copying machine 10 is located on the first floor, copying machine 20 is located on the second floor, and copying machine 30 is located on the third floor.

Next, the functions of the fax server means, user data storage means, and temporary storage means will be described.

The fax server means functions to both facsimile transmit image data acquired from the copying machine 30 over the public telephone network KN, and facsimile transmit image data acquired from the copying machines 10, 20 and the data processing devices 100, 200, 300 connected to the local area network.

The user data storage means functions to associate and store, for example, one or more user IDs (data that identifies one or more users in business A) with the e-mail address that corresponds to each user. The user data storage means will use the data stored therein to notify a user of the results of their facsimile transmission by the fax server 50.

The temporary storage means functions to temporarily store image data that is to be facsimile transmitted, when the fax server 50 is unable to immediately transmit that facsimile.

In addition, specific examples of the memory 51 which functions as the user data storage means and the temporary storage means include a hard disk, a non-volatile memory, or the like.

Next, the process by which the copying machine 30 transmits a facsimile will be described with reference to FIG. 2.

First, in Step S10, the fax server 50 receives the image data to be facsimile transmitted, and the user ID of the user that is attempting to facsimile transmit that image data, and stores this data in the memory 51.

Note that the image data may have been produced by the scanners 40 associated with the copying machines 10, 20 or 30, or be from the data processing devices 100, 200, 300. The image data from all these devices (except the copying machine 30) is sent to the fax server 50 via the local area network to which each is connected. In addition, when image data is to be facsimile transmitted, the user will have already input his or her user ID into the copying machine or data processing device that produced the image data.

Next, in Step S20, the fax server 50 determines whether or not the image data received in Step S10 can be facsimile transmitted. Here, it is determined whether or not the copying machine 30 is available to facsimile transmit the image data. For example, if it is determined that the facsimile cannot be transmitted because another user is using the copying machine 30 to copy documents, then the process will move to Step S25, and will wait until the copying machine 30 is available for use. Note that the image data that is to be facsimile transmitted is stored in the memory 51 during the waiting period of Step S25.

If it is determined in Step S20 that a facsimile can be sent, then the process moves to Step S30, and the fax server 50 will facsimile transmit the image data (S30).

Next, in Step S40, it is determined whether or not the fax server 50 has normally executed the facsimile transmission process in Step S30. Here, for example, it is determined whether or not the telephone connection has been cut during the facsimile transmission.

If in Step S40 it is determined that the transmission has been completed, then the process moves to Step S50, and based upon the image data and the user ID acquired in Step 10, the fax server 50 extracts the user ID stored in the memory 51 and the e-mail address associated with the user ID, and then generates and transmits an e-mail message to the user informing him or her that the facsimile has been successfully sent.

On other hand, if the transmission in Step S40 was not successfully completed, the process moves to Step S60, and based upon the image data and the user ID acquired in Step 10, the fax server 50 extracts the user ID stored in the memory 51 and the e-mail address associated with the user ID, and then generates and transmits an e-mail message to the user informing him or her that the facsimile has not been successfully sent.

By executing the aforementioned process, the copying machine 30 eliminates the need to provide a fax modem in each copying machine because it is capable of receiving image data acquired from other copying machines and/or data processing devices and facsimile transmitting that data. Thus, the copying machine 30 is capable of reducing the initial cost of installing copying machines, reducing the public telephone network access fees, and reduce the cost of administering the system.

In addition, even in situations in which a facsimile cannot be transmitted by the copying machine 30 for some reason (such as when another person is using the copying machine 30 to copy documents), the facsimile will eventually be transmitted after the reasons preventing it have been eliminated. Furthermore, the copying machine 30 is capable of notifying a user who is attempting to transmit a facsimile whether or not the facsimile has been successfully transmitted, and also allows a user to confirm the details of their facsimile transmission.

Other Modifications

The memory 51 in the embodiment described above may also function as a transmission recording means.

This transmission recording means functions to associate and store two or more data items selected from data relating to the user ID of a user that transmits a facsimile, the data and time that acquired image data was facsimile transmitted, and the image processing device or data processing device that generated a request to transmit a facsimile.

For example, in this modification, data relating to the image data and the user ID that was acquired in Step S10, and the data and time that a facsimile was transmitted and the image processing device or data processing device that generated the request to transmit the facsimile that was acquired in Steps S30 to S50, can be stored in the memory 51 after the completion of Step S50.

Storing this data in memory 51 allows one to search for data regarding a facsimile transmission by the copying machine 30, and also allows one to identify the user that transmitted a facsimile and the device that the user used.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

The invention claimed is:

1. An image processing system, comprising:
   a plurality of copying machines configured to process image data and directly connected to each other via a local area network, each of the plurality of copying machines having a document scanner; and
   at least one data processing device configured to be directly connected to the plurality of copying machines via the local area network,
   one of the plurality of copying machines configured to be connected to a public telephone network and having
      a fax server configured to facsimile transmit image data over the public telephone network directly acquired from a remainder of the plurality of copying machines and/or the at least one data processing device via the local area network, and
      a transmission storage unit configured to record user ID after facsimile transmission and to associate two or more data items selected from data relating to the user ID that are facsimile transmitting image data, the date and time that indicating the image data were facsimile transmitted, and the copying machine or data processing device that generated a request to facsimile transmit the image data.

2. The image processing system according to claim 1, wherein among the plurality of copying machines only the one of the plurality of copying machines having the fax server has non-volatile memory.

3. The image processing system according to claim 2, wherein among the plurality of copying machines only the one of the plurality of copying machines having the fax server is directly connected to the public telephone network.

4. The image processing system according to claim 3, wherein the plurality of copying machines are located on different floors of a building.

5. An image processing system, comprising:
   a plurality of copying machines configured to process image data and directly connected to each other via a local area network, each of the plurality of copying machines having a document scanner; and
   at least one data processing device configured to be directly connected to the plurality of copying machines via the local area network,
   one of the plurality of copying machines configured to be connected to a public telephone network and having
      a fax server configured to facsimile transmit image data over the public telephone network directly acquired from a remainder of the plurality of copying machines and/or the at least one data processing device via the local area network, and
      a user data storage unit including an HDD device configured to store a user ID of a user that is facsimile transmitting image data, and associating the user ID to a corresponding e-mail address and storing that data, the copying machine having the fax server being configured to notify the user having the user ID of whether the facsimile transmission has been completed and confirm the details of the facsimile transmission based upon the data stored on the HDD device.

6. The image processing system according to claim 5, wherein
   among the plurality of copying machines only the one of the plurality of copying machines having the fax server has non-volatile memory.

7. The image processing system according to claim 6, wherein
   among the plurality of copying machines only the one of the plurality of copying machines having the fax server is directly connected to the public telephone network.

8. The image processing system according to claim 7, wherein
   the plurality of copying machines are located on different floors of a building.

9. An image processing system, comprising:
   a plurality of copying machines configured to process image data and directly connected to each other via a local area network, each of the plurality of copying machines having a document scanner; and
   at least one data processing device configured to be directly connected to the plurality of copying machines via the local area network,
   one of the plurality of copying machines configured to be connected to a public telephone network and having
      a fax server configured to facsimile transmit image data over the public telephone network directly acquired from a remainder of the plurality of copying machines and/or the at least one data processing device via the local area network, and
      a temporary storage unit configured to store temporarily image data that is to be facsimile transmitted if the fax server is unable to conduct immediately facsimile transmission.

10. The image processing system according to claim 9, wherein among the plurality of copying machines only the one of the plurality of copying machines having the fax server has non-volatile memory.

11. The image processing system according to claim 10, wherein among the plurality of copying machines only the one of the plurality of copying machines having the fax server is directly connected to the public telephone network.

12. The image processing system according to claim 11, wherein the plurality of copying machines are located on different floors of a building.

13. An image processing system, comprising:
- at least one first copying machine having a first scanner being configured to read image data;
- a second copying machine having
  - a second scanner being configured to read image data,
  - memory configured to store data, user IDs and email addresses corresponding to each user ID, and
  - a fax server being connected to a public telephone network, and being configured to facsimile transmit image data acquired from the second scanner and the first copying machine, the memory being configured to notify each user of the results of respective facsimile transmissions; and
- a LAN,
- the first and second copying machines being directly connected to the LAN, the first and second copying machines directly communicating with each other through the LAN,
- between the first and second copying machines only the second copying machine has a fax server.

14. The image processing system according to claim 13, further comprising data processing devices connect to the LAN and configured to communicate with the first and second copying machines, the first and second copying machines configured to acquire and print image data from the data processing devices, and the second copying machine configured to facsimile transmit image data acquired from the data processing devices.

15. The image processing system according to claim 14, wherein
- the memory is configured to store temporarily image data to be facsimile transmitted.

16. The image processing system according to claim 13, wherein
- the memory is configured to store temporarily image data to be facsimile transmitted.

17. The image processing system according to claim 13, wherein
- between the first and second copying machines only the second copying machine has non-volatile memory.

18. The image processing system according to claim 17, wherein
- between the first and second copying machines only the second copying machine has is directly connected to the public telephone network.

19. The image processing system according to claim 18, wherein
- each of the first and second copying machines is located on a different floor of a building.

* * * * *